US010063685B2

(12) United States Patent
Zhao (10) Patent No.: US 10,063,685 B2
(45) Date of Patent: Aug. 28, 2018

(54) AUTOMATIC EXECUTION METHOD AND DEVICE FOR OPERATION OF MOBILE TERMINAL, AND MOBILE TERMINAL

(71) Applicant: ZTE CORPORATION, Shenzhen, Guangdong Province (CN)

(72) Inventor: Dongxiao Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/329,252

(22) PCT Filed: Nov. 3, 2014

(86) PCT No.: PCT/CN2014/090166
§ 371 (c)(1),
(2) Date: Jun. 6, 2017

(87) PCT Pub. No.: WO2015/154446
PCT Pub. Date: Oct. 15, 2015

(65) Prior Publication Data
US 2017/0272567 A1 Sep. 21, 2017

(30) Foreign Application Priority Data

Aug. 8, 2014 (CN) .......................... 2014 1 0390925

(51) Int. Cl.
*H04W 24/00* (2009.01)
*H04M 1/725* (2006.01)
*H04W 4/02* (2018.01)

(52) U.S. Cl.
CPC ....... *H04M 1/72569* (2013.01); *H04W 4/027* (2013.01); *H04M 2250/12* (2013.01)

(58) Field of Classification Search
CPC .......................... H04M 15/8033; H04W 48/08
(Continued)

(56) References Cited

U.S. PATENT DOCUMENTS 7,676,340 B2 * 3/2010 Yasui ..................... G01C 17/38
365/211
2006/0116175 A1 6/2006 Chu
(Continued)

FOREIGN PATENT DOCUMENTS

CN 102884841 A 1/2013
CN 202907027 U 4/2013
(Continued)

*Primary Examiner* — Kiet Doan
(74) *Attorney, Agent, or Firm* — Ling Wu; Stephen Yang; Ling and Yang Intellectual Property (57) ABSTRACT

Embodiments of the present disclosure provide a method and device for automatically executing an operation of a mobile terminal, and a mobile terminal. The method for automatically executing an operation of a mobile terminal includes: acquiring current moving/stationary situation information, an internal temperature and a current environment temperature of the mobile terminal, herein the current moving/stationary situation information of the mobile terminal includes information indicating that the mobile terminal is stationary at current or the mobile terminal is moving at current; determining a current state of the mobile terminal according to the current moving/stationary situation information, the internal temperature and the current environment temperature; and executing a preset operation according to the current state.

17 Claims, 2 Drawing Sheets

(58) Field of Classification Search
USPC ............... 455/574, 407, 456.3; 345/174, 633
See application file for complete search history.

(56) References Cited

U.S. PATENT DOCUMENTS

| | | | |
|---|---|---|---|
| 2011/0273378 A1 | 11/2011 | Alameh et al. | |
| 2011/0304648 A1* | 12/2011 | Kim ..................... | G06F 1/1626 345/633 |
| 2012/0094714 A1 | 4/2012 | Yoshikawa | |
| 2014/0028445 A1* | 1/2014 | Wild ...................... | F24C 7/082 340/10.3 |

FOREIGN PATENT DOCUMENTS

| CN | 103780748 A | 5/2014 |
|---|---|---|
| CN | 103943106 A | 7/2014 |

* cited by examiner

AUTOMATIC EXECUTION METHOD AND DEVICE FOR OPERATION OF MOBILE TERMINAL, AND MOBILE TERMINAL

TECHNICAL FIELD

The present disclosure relates to a terminal application technology, and in particular to an operation of a mobile terminal.

BACKGROUND

When people use mobile phones in daily life, different magnitudes of vibration or volume will be set according to different scenarios. On traditional functional mobile phones, such mode is referred as a scenario mode. However, that function is gradually faded on smart phones, but demands of users are not changed thereby. For example, when a user is in an office, volume needs to be turned down; and when a mobile phone is put in a pocket or a bag, to avoid misses of calls and short messages, the volume of the mobile phone needs to be turned up; and when the user sleeps, the volume and the vibration need to be turned off or a flight mode is turned on. In daily life, since the users forgot to adjust volume, vibration and the like, great inconvenience is brought to mobile phone users.

SUMMARY

Embodiments of the present disclosure provide a method and device for automatically executing an operation of a mobile terminal, and a mobile terminal, which can determine a current state of a mobile terminal according to an internal temperature, a current environment temperature and current moving/stationary situation information of the mobile terminal, to automatically execute a corresponding preset operation, such that the mobile terminal can automatically adjust related settings according to different scenarios.

According to one aspect of the present disclosure, an embodiment of the present disclosure provides a method for automatically executing an operation of a mobile terminal. The method includes: acquiring current moving/stationary situation information, an internal temperature and a current environment temperature of a mobile terminal, herein the current moving/stationary situation information of the mobile terminal includes information indicating that the mobile terminal is stationary at current or the mobile terminal is moving at current; determining a current state of the mobile terminal according to the current moving/stationary situation information, the internal temperature and the current environment temperature; and executing a preset operation according to the current state.

In an exemplary embodiment, acquiring current moving/stationary situation information of the mobile terminal includes: acquiring a movement acceleration of the mobile terminal through an acceleration sensor; and acquiring the current moving/stationary situation information of the mobile terminal according to the movement acceleration.

In an exemplary embodiment, acquiring an internal temperature and a current environment temperature of a mobile terminal includes: acquiring the internal temperature of the mobile terminal through a first temperature sensor arranged inside the mobile terminal; and acquiring the current environment temperature of the mobile terminal through a second temperature sensor arranged on a surface of a housing of the mobile terminal.

In an exemplary embodiment, the second temperature sensor is a plurality of second temperature sensors; and acquiring the current environment temperature of the mobile terminal through a second temperature sensor arranged on a surface of a housing of the mobile terminal includes: acquiring a plurality of environment temperatures through the plurality of second temperature sensors; and acquiring an expected value of the plurality of environment temperatures as the current environment temperature.

In an exemplary embodiment, determining a current state of the mobile terminal according to the current moving/stationary situation information, the internal temperature and the current environment temperature includes the following operations.

When the mobile terminal is moving at current, if a difference between the internal temperature and the current environment temperature is smaller than a preset first temperature threshold, it is determined the current state of the mobile terminal as that the mobile terminal is in an exposed environment and a moving state; if the difference between the internal temperature and the current environment temperature is greater than or equal to the preset first temperature threshold and is smaller than or equal to a preset second temperature threshold, it is determined the current state of the mobile terminal as that the mobile terminal is in a shallow hidden environment and a moving state; and if the difference between the internal temperature and the current environment temperature is greater than the preset second temperature threshold, it is determined the current state of the mobile terminal as that the mobile terminal is in a deep hidden environment and a moving state.

When the mobile terminal is stationary at current, if the difference between the internal temperature and the current environment temperature is smaller than a preset third temperature threshold, it is determined the current state of the mobile terminal as that the mobile terminal is in an exposed environment and a stationary state; and if the difference between the internal temperature and the current environment temperature is greater than or equal to the preset third temperature threshold, it is determined the current state of the mobile terminal as that the mobile terminal is in a hidden environment and a stationary state.

In an exemplary embodiment, before determining the current state of the mobile terminal according to the current moving/stationary situation information, the internal temperature and the current environment temperature, the method further includes: respectively determining the first temperature threshold, the second temperature threshold and the third temperature threshold according to a current CPU use rate and a standby current magnitude of the mobile terminal.

According to another aspect of the present disclosure, an embodiment of the present disclosure further provides a device for automatically executing an operation of a mobile terminal. The device includes an acquisition module, a first determination module and an execution module. The acquisition module is arranged to acquire current moving/stationary situation information, an internal temperature and a current environment temperature of the mobile terminal. Herein, the current moving/stationary situation information of the mobile terminal includes information indicating that the mobile terminal is stationary at current or the mobile terminal is moving at current. The first determination module is arranged to determine a current state of the mobile terminal according to the current moving/stationary situation information, the internal temperature and the current environment temperature. The execution module is arranged to execute a preset operation according to the current state.

In an exemplary embodiment, the acquisition module includes a first acquisition sub-module and a second acquisition sub-module. The first acquisition sub-module is arranged to acquire a movement acceleration of the mobile terminal through an acceleration sensor. The second acquisition sub-module is arranged to acquire the current moving/stationary situation information of the mobile terminal according to the movement acceleration.

In an exemplary embodiment, the acquisition module includes a third acquisition sub-module and a fourth acquisition sub-module. The third acquisition sub-module is arranged to acquire the internal temperature of the mobile terminal through a first temperature sensor arranged inside the mobile terminal. The fourth acquisition sub-module is arranged to acquire the current environment temperature of the mobile terminal through a second temperature sensor arranged on a surface of a housing of the mobile terminal.

In an exemplary embodiment, the second temperature sensor is a plurality of second temperature sensors. The fourth acquisition sub-module includes a first acquisition unit and a second acquisition unit. The first acquisition unit is arranged to acquire a plurality of environment temperatures through the plurality of second temperature sensors. The second acquisition unit is arranged to acquire an expected value of the plurality of environment temperatures as the current environment temperature.

In an exemplary embodiment, the first determination module includes a first determination sub-module and a second determination sub-module.

The first determination sub-module is arranged to, when the mobile terminal is moving at current, if a difference between the internal temperature and the current environment temperature is smaller than a preset first temperature threshold, determine the current state of the mobile terminal as that the mobile terminal is in an exposed environment and a moving state; if the difference between the internal temperature and the current environment temperature is greater than or equal to the preset first temperature threshold and is smaller than or equal to a preset second temperature threshold, determine that the current state of the mobile terminal as that the mobile terminal is in a shallow hidden environment and a moving state; and if the difference between the internal temperature and the current environment temperature is greater than the preset second temperature threshold, determine the current state of the mobile terminal as that the mobile terminal is in a deep hidden environment and a moving state.

The second determination sub-module arranged to, when the mobile terminal is stationary at current, if the difference between the internal temperature and the current environment temperature is smaller than a preset third temperature threshold, determine the current state of the mobile terminal as that the mobile terminal is in an exposed environment and a stationary state; and if the difference between the internal temperature and the current environment temperature is greater than or equal to the preset third temperature threshold, determine the current state of the mobile terminal as that the mobile terminal is in a hidden environment and a stationary state.

In an exemplary embodiment, the device further includes: a second determination module arranged to respectively determine the first temperature threshold, the second temperature threshold and the third temperature threshold according to a current CPU use rate and a standby current magnitude of the mobile terminal.

According to another aspect of the present disclosure, an embodiment of the present disclosure further provides a mobile terminal, including: an internal temperature sensor, an external temperature sensor, an acceleration sensor and the automobile execution device for the operation of the mobile terminal. Herein, the internal temperature sensor is arranged to acquire an internal temperature of the mobile terminal. The external temperature sensor is arranged to acquire a current environment temperature of the mobile terminal. The acceleration sensor is arranged to acquire current moving/stationary situation information of the mobile terminal. Herein, the current moving/stationary situation information of the mobile terminal includes information indicating that the mobile terminal is stationary at current or the mobile terminal is moving at current.

According to another aspect of the present disclosure, an embodiment of the present disclosure further provides a computer program and a carrier thereof. The computer program includes program instructions, and when the program instructions are executed by a mobile terminal, the mobile terminal can execute the method for automatically executing an operation of a mobile terminal.

The above-mentioned technical solution of the embodiments of the present disclosure has the following beneficial effects:

The method and device for automatically executing an operation of a mobile terminal, and the mobile terminal provided by the embodiments of the present disclosure can determine a current state of a mobile terminal according to an internal temperature, a current environment temperature and current moving/stationary situation information of the mobile terminal, to automatically execute a corresponding preset operation, such that the mobile terminal can automatically adjust related settings according to different scenarios.

DETAILED DESCRIPTION

The embodiments of the present disclosure will be described below in detail with reference to the drawings. It needs to be stated that the embodiments in the present disclosure and the features in the embodiments may be mutually and freely combined under the situation of no conflict. Although a logic sequence is illustrated in flowcharts, the illustrated or described steps may be executed according to a sequence different from a sequence here under certain circumstances.

Aiming at the situation that calls are missed since terminal users often forget to adjust settings of mobile terminals according to different scenarios in the related art, an embodiment of the present disclosure provides a method and device for automatically executing an operation of a mobile terminal, and a mobile terminal, which can determine a current state of a mobile terminal according to an internal temperature, a current environment temperature and current moving/stationary situation information of the mobile terminal, to automatically execute a corresponding preset operation, such that the mobile terminal can automatically adjust related settings according to different scenarios.

Figure 1:
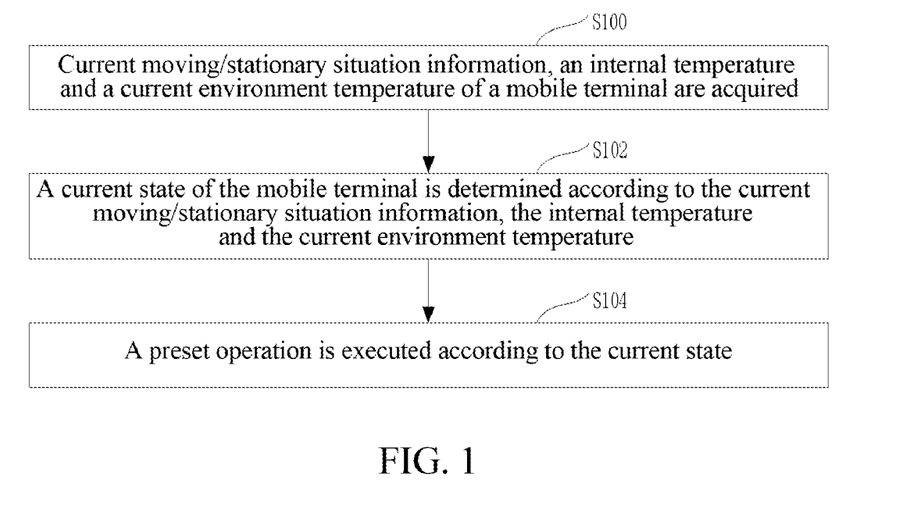
FIG. 1 illustrates a flowchart of a method for automatically executing an operation of a mobile terminal provided by embodiment 1 of the present disclosure.

FIG. 1 illustrates a flowchart of a method for automatically executing an operation of a mobile terminal provided by embodiment 1 of the present disclosure. As illustrated in FIG. 1, the method includes the following steps S100-S104.

In step S100, current moving/stationary situation information, an internal temperature and a current environment temperature of a mobile terminal are acquired. Herein, the current moving/stationary situation information of the mobile terminal includes information indicating that the mobile terminal is stationary at current or the mobile terminal is moving at current.

In step S102, a current state of the mobile terminal is determined according to the current moving/stationary situation information, the internal temperature and the current environment temperature.

In step S104, a preset operation is executed according to the current state.

In the method for automatically executing an operation of a mobile terminal, by acquiring the moving/stationary situation that the mobile terminal is stationary or moving at current and the internal temperature and the current environment temperature of the mobile terminal, the current state of the mobile terminal is determined and thus a preset operation corresponding to the current state is executed.

According to the method for automatically executing an operation of a mobile terminal provided by the embodiment of the present disclosure, since the current state of the mobile terminal can be determined according to the current moving/stationary situation, the internal temperature and the current ambient temperature of the mobile terminal and the corresponding preset operation is executed, the mobile terminal can automatically adjust related settings according to different scenarios.

In one specific embodiment of the present disclosure, the step S100 may specifically include the following operations. A movement acceleration of the mobile terminal is acquired through an acceleration sensor. The current moving/stationary situation information of the mobile terminal is acquired according to the movement acceleration.

The mobile terminal may acquire the movement acceleration of the mobile terminal through the acceleration sensor and determine that the mobile terminal is stationary or moving according to the movement acceleration. For example, if the times of movement of the mobile terminal and a time interval of movement at each time detected by the acceleration sensor within a period of time t are smaller than preset thresholds, it may be determined that the mobile terminal is stationary. The purpose of doing that is to avoid the situation that certain vibration of the mobile terminal is mistakenly considered as the movement of the mobile terminal. For example, when the mobile terminal is put on a table and the mobile terminal is stationary, if the table is touched and shakes, the acceleration sensor will detect movement acceleration within short time. If it is determined that the mobile terminal is moving according to the movement acceleration, misjudgment will be caused. To avoid similar situations, a threshold may be set.

In one specific embodiment of the present disclosure, the step S100 may specifically include the following operations. The internal temperature of the mobile terminal is acquired through a first temperature sensor arranged inside the mobile terminal. The current environment temperature of the mobile terminal is acquired through a second temperature sensor arranged on a surface of a housing of the mobile terminal.

The mobile terminal may acquire the internal temperature and the current environment temperature of the mobile terminal through temperature sensors. Specifically, the internal temperature of the mobile terminal is acquired through a temperature sensor arranged inside the mobile terminal. The temperature sensor may be a temperature sensor self-contained by a chip used by the mobile terminal, and may also be a temperature sensor which is separately arranged. The current environment temperature is acquired through a temperature sensor arranged on the surface of the housing of the mobile terminal.

In one specific embodiment of the present disclosure, the second temperature sensor is a plurality of second temperature sensors. The operation of acquiring the current environment temperature of the mobile terminal through the second temperature sensors includes the following operations. A plurality of environment temperatures are acquired through the plurality of second temperature sensors. An expected value of the plurality of environment temperatures is acquired as the current environment temperature.

To enable the acquired current environment temperature to be more accurate, the current environment temperature may be obtained through temperatures acquired by a plurality of temperature sensors arranged on the surface of the housing of the mobile terminal. Specifically, the distribution of the temperature values measured by the plurality of temperature sensors may be analyzed and an expected value of the plurality of temperature values is acquired as the current environment temperature.

In a specific embodiment of the present disclosure, the step S102 may specifically include the following operations. When the mobile terminal is stationary at current, if a difference between the internal temperature and the current environment temperature is smaller than a preset first temperature threshold, the current state of the mobile terminal is determined as that the mobile terminal is in an exposed environment and a stationary state; if the difference between the internal temperature and the current environment temperature is greater than or equal to the preset first temperature threshold, the current state of the mobile terminal is determined as that the mobile terminal is in a hidden environment and a stationary state. When the mobile terminal is moving at current, if the difference between the internal temperature and the current environment temperature is smaller than a preset second temperature threshold, the current state of the mobile terminal is determined as that the mobile terminal is in an exposed environment and moving state; if the difference between the internal temperature and the current environment temperature is greater than or equal to the preset second temperature threshold and is smaller than or equal to a preset third temperature threshold, the current state of the mobile terminal is determined as that the mobile terminal is in a shallow hidden environment and moving state; and if the difference between the internal temperature and the current environment temperature is greater than the preset third temperature threshold, the current state of the mobile terminal is determined as that the mobile terminal is in a deep hidden environment and moving state.

When the mobile terminal is stationary, environments in which the mobile terminal is located may be divided into two types. Herein, a first type is exposed environment, i.e., the mobile terminal is placed in an open space, e.g., on a tabletop; and a second type is hidden environment, i.e., the mobile terminal is placed in a closed space, e.g., in a drawer, a bag or a pocket of clothes which are not put on by a user. When the mobile terminal is in a hidden environment, since heat is not easy to dissipate in the closed space, the internal temperature and the current environment temperature of the mobile terminal have a great difference. Therefore, the environment in which the mobile terminal is located can be determined according to the difference between the internal temperature and the current environment temperature of the mobile terminal.

When the mobile terminal is moving, environments in which the mobile terminal is located may be divided into three types. Herein, a first type is an exposed environment, i.e., the mobile terminal is placed in an open space, e.g., on a tabletop; a second type is a deep hidden environment, i.e., the mobile terminal is placed in a pocket of clothes which are put on by a user; and a third type is a shallow hidden environment, i.e., the mobile terminal is placed in other closed spaces, e.g., a bag. When the mobile terminal is placed in the pocket of the clothes which are put on by the user, since the mobile terminal is carried with the user, the automatic operation executed by the mobile terminal may be distinguished from the automatic operation executed when the mobile terminal is in other closed spaces. When the mobile terminal is in a deep hidden environment, i.e., the pocket of the clothes which are put on by the user, since the mobile terminal is carried with the user, the current environment temperature of the mobile terminal will be influenced by body temperature of the user; and simultaneously, since the internal space of the pocket is small, at this moment the difference between the internal temperature and the current environment temperature of the mobile terminal is greater than the difference therebetween when the mobile terminal is in a shallow hidden environment. Therefore, the environment in which the mobile terminal is located can be determined according to the difference between the internal temperature and the current environment temperature of the mobile terminal.

In the method for automatically executing an operation of a mobile terminal provided by the embodiment of the present disclosure, the current state of the mobile terminal is determined by comparing the difference between the internal temperature and the current environment temperature of the mobile terminal with the preset first temperature threshold, second temperature threshold or third temperature threshold. However, actually the difference between the internal temperature and the current environment temperature of the mobile terminal will be influenced by factors a current CPU use rate and a standby current magnitude of the mobile terminal. Therefore, if the adopted preset first temperature threshold, second temperature threshold or third temperature threshold is a fixed value, a judgment result will be caused to be inaccurate.

Therefore, in an exemplary embodiment, in the method for automatically executing an operation of a mobile terminal, before the current state of the mobile terminal is determined according to the current moving/stationary situation information, the internal temperature and the current environment temperature, the method further includes the following step. The first temperature threshold, the second temperature threshold and the third temperature threshold are respectively determined according to a current CPU use rate and a standby current magnitude of the mobile terminal.

By respectively determining the first temperature threshold, the second temperature threshold and the third temperature threshold according to the current CPU use rate and the standby current magnitude of the mobile terminal, the influence caused by the current CPU use rate and the standby current magnitude of the mobile terminal is avoided and the current state of the mobile terminal can be more accurately determined.

Figure 2:
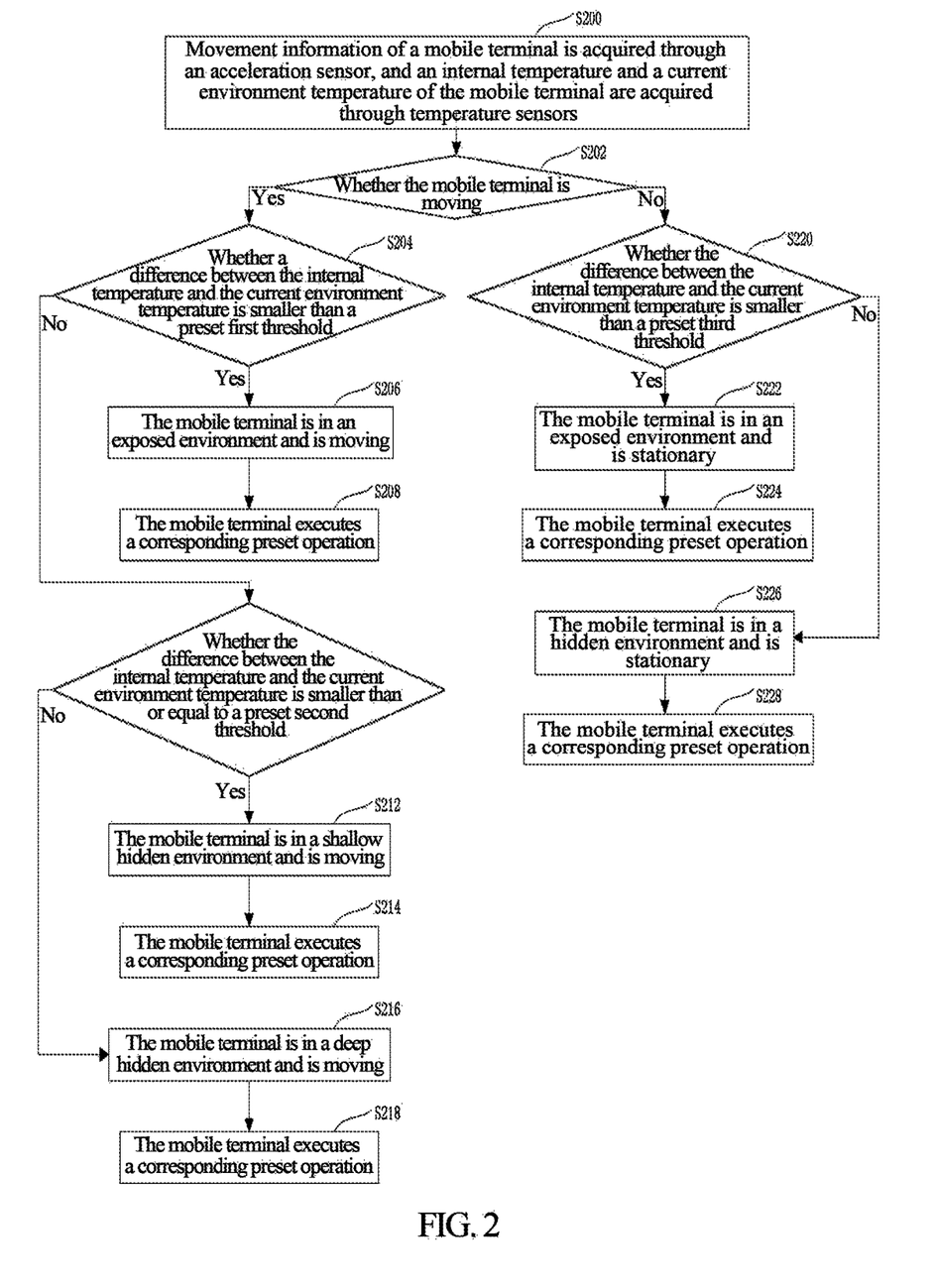
FIG. 2 illustrates a flowchart of a method for automatically executing an operation of a mobile terminal provided by embodiment 2 of the present disclosure.

FIG. 2 illustrates a flowchart of a method for automatically executing an operation of a mobile terminal provided by embodiment 2 of the present disclosure. As illustrated in FIG. 2, the method includes the following steps S200-S228.

In step S200, movement information of a mobile terminal is acquired through an acceleration sensor, and an internal temperature and a current environment temperature of the mobile terminal are acquired through temperature sensors.

In step S202, whether the mobile terminal is moving is judged. If yes, step S204 is executed, and if no, step S220 is executed. Specifically, if the movement information detected by the acceleration sensor within a period of time indicates that the mobile terminal is stationary, or the movement information of the mobile terminal detected by the acceleration sensor within such period of time indicates that the mobile terminal is moved but a time interval of movement is smaller than a preset threshold, it is considered that the mobile terminal is stationary. If the movement information detected by the acceleration sensor within a period of time indicates that the mobile terminal is moving, or the movement information of the mobile terminal detected by the acceleration sensor within such period of time indicates that the mobile terminal is moved and the time interval of movement is greater than the preset threshold, it is considered as that the mobile terminal is moving.

In step S204, whether a difference between the internal temperature and the current environment temperature is smaller than a preset first threshold F1 is judged. If yes, step S206 is executed, and if no, step S210 is executed. Herein, the first threshold F1 is a variable which is determined according to a current CPU use rate and a standby current magnitude of the mobile terminal.

In step S206, the mobile terminal is in an exposed environment and is moving, e.g., a user holds the mobile terminal in a hand.

In step S208, the mobile terminal executes a corresponding preset operation, e.g., the mobile terminal is adjusted to be in a mute mode.

In step S210, whether the difference between the internal temperature and the current environment temperature is greater than or equal to a preset second threshold F2 is judged. If yes, step S212 is executed, and if no, step S216 is executed. Herein, the second threshold F2 is a variable which is determined according to the current CPU use rate and the standby current magnitude of the mobile terminal.

In step S212, the mobile terminal is in a shallow hidden environment and is moving, e.g., the user places the mobile terminal in a bag backpacked by the user during walking.

In step S214, the mobile terminal executes a corresponding preset operation, e.g., the mobile terminal is adjusted to be in a ringing mode and a ring volume magnitude is set.

In step S216, the mobile terminal is in a deep hidden environment and is moving, e.g., the user places the mobile terminal in a pocket of clothes which are put on during walking.

In step S218, the mobile terminal executes a corresponding preset operation, e.g., the mobile terminal is adjusted to be in a vibration mode.

In step S220, whether the difference between the internal temperature and the current environment temperature is smaller than a preset third threshold F3 is judged. If yes, step S222 is executed, and if no, step S226 is executed. Herein, the third threshold F3 is a variable which is determined according to the current CPU use rate and the standby current magnitude of the mobile terminal.

In step S222, the mobile terminal is in an exposed environment and is stationary, e.g., the mobile terminal is placed on a table.

In step S224, the mobile terminal executes a corresponding preset operation, e.g., the mobile terminal is adjusted to be in a mute mode.

In step S226, the mobile terminal is in a hidden environment and is stationary, e.g., the mobile terminal is placed in a bag or a drawer.

In step S228, the mobile terminal executes a corresponding preset operation, e.g., the mobile terminal is adjusted to be in a ringing mode and a ring volume is set.

An embodiment of the present disclosure further provides a device for automatically executing an operation of a mobile terminal, including an acquisition module, a first determination module and an execution module. The acquisition module is arranged to acquire current moving/stationary situation information, an internal temperature and a current environment temperature of the mobile terminal. Herein, the current moving/stationary situation information of the mobile terminal includes information indicating that the mobile terminal is stationary at current or the mobile terminal is moving at current. The first determination module is arranged to determine a current state of the mobile terminal according to the current moving/stationary situation information, the internal temperature and the current environment temperature. The execution module is arranged to execute a preset operation according to the current state.

In the device for automatically executing an operation of a mobile terminal, the acquisition module includes a first acquisition sub-module and a second acquisition sub-module. The first acquisition sub-module is arranged to acquire a movement acceleration of the mobile terminal through an acceleration sensor. The second acquisition sub-module is arranged to acquire the current moving/stationary situation information of the mobile terminal according to the movement acceleration.

In the device for automatically executing an operation of a mobile terminal, the acquisition module includes a third acquisition sub-module and a fourth acquisition sub-module. The third acquisition sub-module is arranged to acquire the internal temperature of the mobile terminal through a first temperature sensor arranged inside the mobile terminal. The fourth acquisition sub-module is arranged to acquire the current environment temperature of the mobile terminal through a second temperature sensor arranged on a surface of a housing of the mobile terminal.

In the device for automatically executing an operation of a mobile terminal, the second temperature sensor is a plurality of second temperature sensors; and the fourth acquisition sub-module includes a first acquisition unit and a second acquisition unit. The first acquisition unit is arranged to acquire a plurality of environment temperatures through the plurality of second temperature sensors. The second acquisition unit is arranged to acquire an expected value of the plurality of environment temperatures as the current environment temperature.

In the device for automatically executing an operation of a mobile terminal, the first determination module includes a first determination sub-module and a second determination sub-module.

The first determination sub-module is arranged to, when the mobile terminal is moving at current, if a difference between the internal temperature and the current environment temperature is smaller than a preset first temperature threshold, determine the current state of the mobile terminal as that the mobile terminal is in an exposed environment and a moving state; if the difference between the internal temperature and the current environment temperature is greater than or equal to the preset first temperature threshold and is smaller than or equal to a preset second temperature threshold, determine that the current state of the mobile terminal as that the mobile terminal is in a shallow hidden environment and a moving state; and if the difference between the internal temperature and the current environment temperature is greater than the preset second temperature threshold, determine the current state of the mobile terminal as that the mobile terminal is in a deep hidden environment and a moving state.

The second determination sub-module is arranged to, when the mobile terminal is stationary at current, if the difference between the internal temperature and the current environment temperature is smaller than a preset third temperature threshold, determine the current state of the mobile terminal as that the mobile terminal is in an exposed environment and a stationary state; and if the difference between the internal temperature and the current environment temperature is greater than or equal to the preset third temperature threshold, determine the current state of the mobile terminal as that the mobile terminal is in a hidden environment and a stationary state.

In the device for automatically executing an operation of a mobile terminal, the device further includes a second determination module arranged to respectively determine the first temperature threshold, the second temperature threshold and the third temperature threshold according to a current CPU use rate and a standby current magnitude of the mobile terminal.

The embodiment of the present disclosure further provides a mobile terminal, including an internal temperature sensor, an external temperature sensor, an acceleration sensor and the automobile execution device for the operation of the mobile terminal. The internal temperature sensor is arranged to acquire an internal temperature of the mobile terminal. The external temperature sensor is arranged to acquire a current environment temperature of the mobile terminal. The acceleration sensor is arranged to acquire current moving/stationary situation information of the mobile terminal. Herein, the current moving/stationary situation information of the mobile terminal includes information indicating that the mobile terminal is stationary at current or the mobile terminal is moving at current.

One ordinary person skilled in the art can understand that all or partial steps in the above-mentioned methods may be completed by relevant hardware instructed by a program, and the program may be stored in a computer readable storage medium such as a read-only memory and so on. Alternatively, all or partial steps in the above-mentioned embodiments may also be implemented by using one or more integrated circuits. Correspondingly, each module/unit in the above-mentioned embodiments may be implemented by means of hardware and may also be implemented by means of a software function module. The present disclosure is not limited to combinations of hardware and software in any specific form.

Of course, the present disclosure may also have other various environments. One skilled in the art may make various corresponding modifications and variations according to the present disclosure without departing from the rule and essence of the present disclosure. However, such corresponding modifications and variations shall be still included in the protection scope of the claims of the present disclosure.

INDUSTRIAL APPLICABILITY

According to the method and device for automatically executing an operation of a mobile terminal and the mobile terminal provided by the embodiments of the present disclosure, the current state of the mobile terminal is determined by acquiring the current moving/stationary situation information, the internal temperature and the current environment temperature of the mobile terminal; and the preset operation is executed according to the current state, such that the mobile terminal can automatically adjust related settings according to different scenarios.

What is claimed is:

1. A method for automatically executing an operation of a mobile terminal, comprising:
    acquiring current moving/stationary situation information, an internal temperature and a current environment temperature of a mobile terminal, wherein the current moving/stationary situation information of the mobile terminal comprises information indicating that the mobile terminal is stationary at current or the mobile terminal is moving at current;
    determining a current state of the mobile terminal according to the current moving/stationary situation information, the internal temperature and the current environment temperature; and
    executing a preset operation according to the current state,
    wherein said determining a current state of the mobile terminal according to the current moving/stationary situation information, the internal temperature and the current environment temperature comprises:
    when the mobile terminal is moving at current, if a difference between the internal temperature and the current environment temperature is smaller than a preset first temperature threshold, determining the current state of the mobile terminal as that the mobile terminal is in an exposed environment and a moving state; if the difference between the internal temperature and the current environment temperature is greater than or equal to the preset first temperature threshold and is smaller than or equal to a preset second temperature threshold, determining the current state of the mobile terminal as that the mobile terminal is in a shallow hidden environment and a moving state; and if the difference between the internal temperature and the current environment temperature is greater than the preset second temperature threshold, determining the current state of the mobile terminal as that the mobile terminal is in a deep hidden environment and a moving state; and
    when the mobile terminal is stationary at current, if the difference between the internal temperature and the current environment temperature is smaller than a preset third temperature threshold, determining the current state of the mobile terminal as that the mobile terminal is in an exposed environment and a stationary state, and if the difference between the internal temperature and the current environment temperature is greater than or equal to the preset third temperature threshold, determining the current state of the mobile terminal as that the mobile terminal is in a hidden environment and a stationary state.

2. The method according to claim 1, wherein said acquiring current moving/stationary situation information of a mobile terminal comprises:
    acquiring a movement acceleration of the mobile terminal through an acceleration sensor; and
    acquiring the current moving/stationary situation information of the mobile terminal according to the movement acceleration.

3. The method according to claim 1, wherein said acquiring an internal temperature and a current environment temperature of a mobile terminal comprises:
    acquiring the internal temperature of the mobile terminal through a first temperature sensor arranged inside the mobile terminal; and
    acquiring the current environment temperature of the mobile terminal through a second temperature sensor arranged on a surface of a housing of the mobile terminal.

4. The method according to claim 3, wherein the second temperature sensor is a plurality of second temperature sensors; and said acquiring the current environment temperature of the mobile terminal through a second temperature sensor arranged on a surface of a housing of the mobile terminal comprises:
    acquiring a plurality of environment temperatures through the plurality of second temperature sensors; and
    acquiring an expected value of the plurality of environment temperatures as the current environment temperature.

5. The method according to claim 1, wherein, before determining the current state of the mobile terminal according to the current moving/stationary situation information, the internal temperature and the current environment temperature, the method further comprises:
    determining the first temperature threshold, the second temperature threshold and the third temperature threshold respectively according to a current CPU use rate and a standby current magnitude of the mobile terminal.

6. A non-transitory computer program, comprising program instructions, wherein, when the program instructions are executed by a mobile terminal, the mobile terminal can execute the method according to claim 1.

7. A carrier carrying the computer program according to claim 6.

8. A device for automatically executing an operation of a mobile terminal, comprising:
    an acquisition module arranged to acquire current moving/stationary situation information, an internal temperature and a current environment temperature of the mobile terminal, wherein the current moving/stationary situation information of the mobile terminal comprises information indicating that the mobile terminal is stationary at current or the mobile terminal is moving at current;
    a first determination module arranged to determine a current state of the mobile terminal according to the current moving/stationary situation information, the internal temperature and the current environment temperature; and
    an execution module arranged to execute a preset operation according to the current state,
    wherein the first determination module comprises:
    a first determination sub-module arranged to, when the mobile terminal is moving at current, if a difference between the internal temperature and the current environment temperature is smaller than a preset first temperature threshold, determine the current state of the mobile terminal as that the mobile terminal is in an exposed environment and a moving state; if the difference between the internal temperature and the current environment temperature is greater than or equal to the preset first temperature threshold and is smaller than or equal to a preset second temperature threshold, determine that the current state of the mobile terminal as that the mobile terminal is in a shallow hidden environment and a moving state; and if the difference between the internal temperature and the current environment temperature is greater than the preset second temperature threshold, determine the current state of the mobile terminal as that the mobile terminal is in a deep hidden environment and a moving state; and a second determination sub-module arranged to, when the mobile terminal is stationary at current, if the difference between the internal temperature and the current environment temperature is smaller than a preset third temperature threshold, determine the current state of the mobile terminal as that the mobile terminal is in an exposed environment and a stationary state; and if the difference between the internal temperature and the current environment temperature is greater than or equal to the preset third temperature threshold, determine the current state of the mobile terminal as that the mobile terminal is in a hidden environment and a stationary state.

9. The device according to claim 8, wherein the acquisition module comprises:
a first acquisition sub-module arranged to acquire a movement acceleration of the mobile terminal through an acceleration sensor; and
a second acquisition sub-module arranged to acquire the current moving/stationary situation information of the mobile terminal according to the movement acceleration.

10. A mobile terminal, comprising: an internal temperature sensor, an external temperature sensor, an acceleration sensor and the device for automatically executing an operation of a mobile terminal according to claim 9, wherein,
the internal temperature sensor is arranged to acquire an internal temperature of the mobile terminal;
the external temperature sensor is arranged to acquire a current environment temperature of the mobile terminal; and
the acceleration sensor is arranged to acquire current moving/stationary situation information of the mobile terminal, wherein the current moving/stationary situation information of the mobile terminal comprises information indicating that the mobile terminal is stationary at current or the mobile terminal is moving at current.

11. The device according to claim 8, wherein the acquisition module comprises:
a third acquisition sub-module arranged to acquire the internal temperature of the mobile terminal through a first temperature sensor arranged inside the mobile terminal; and
a fourth acquisition sub-module arranged to acquire the current environment temperature of the mobile terminal through a second temperature sensor arranged on a surface of a housing of the mobile terminal.

12. The device according to claim 11, wherein the second temperature sensor is a plurality of second temperature sensors; and the fourth acquisition sub-module comprises:

a first acquisition unit arranged to acquire a plurality of environment temperatures through the plurality of second temperature sensors; and
a second acquisition unit arranged to acquire an expected value of the plurality of environment temperatures as the current environment temperature.

13. A mobile terminal, comprising: an internal temperature sensor, an external temperature sensor, an acceleration sensor and the device for automatically executing an operation of a mobile terminal according to claim 12, wherein,
the internal temperature sensor is arranged to acquire an internal temperature of the mobile terminal;
the external temperature sensor is arranged to acquire a current environment temperature of the mobile terminal; and
the acceleration sensor is arranged to acquire current moving/stationary situation information of the mobile terminal, wherein the current moving/stationary situation information of the mobile terminal comprises information indicating that the mobile terminal is stationary at current or the mobile terminal is moving at current.

14. A mobile terminal, comprising: an internal temperature sensor, an external temperature sensor, an acceleration sensor and the device for automatically executing an operation of a mobile terminal according to claim 11, wherein,
the internal temperature sensor is arranged to acquire an internal temperature of the mobile terminal;
the external temperature sensor is arranged to acquire a current environment temperature of the mobile terminal; and
the acceleration sensor is arranged to acquire current moving/stationary situation information of the mobile terminal, wherein the current moving/stationary situation information of the mobile terminal comprises information indicating that the mobile terminal is stationary at current or the mobile terminal is moving at current.

15. The device according to claim 8, further comprising:
a second determination module arranged to respectively determine the first temperature threshold, the second temperature threshold and the third temperature threshold according to a current CPU use rate and a standby current magnitude of the mobile terminal.

16. A mobile terminal, comprising: an internal temperature sensor, an external temperature sensor, an acceleration sensor and the device for automatically executing an operation of a mobile terminal according to claim 15, wherein,
the internal temperature sensor is arranged to acquire an internal temperature of the mobile terminal;
the external temperature sensor is arranged to acquire a current environment temperature of the mobile terminal; and
the acceleration sensor is arranged to acquire current moving/stationary situation information of the mobile terminal, wherein the current moving/stationary situation information of the mobile terminal comprises information indicating that the mobile terminal is stationary at current or the mobile terminal is moving at current.

17. A mobile terminal, comprising: an internal temperature sensor, an external temperature sensor, an acceleration sensor and the device for automatically executing an operation of a mobile terminal according to claim 8, wherein,
the internal temperature sensor is arranged to acquire an internal temperature of the mobile terminal;

the external temperature sensor is arranged to acquire a current environment temperature of the mobile terminal; and the acceleration sensor is arranged to acquire current moving/stationary situation information of the mobile terminal, wherein the current moving/stationary situation information of the mobile terminal comprises information indicating that the mobile terminal is stationary at current or the mobile terminal is moving at current.

* * * * *